(12) United States Patent
Jeon et al.

(10) Patent No.: US 11,379,156 B2
(45) Date of Patent: Jul. 5, 2022

(54) WRITE TYPE INDICATION COMMAND

(71) Applicant: Micron Technology, Inc., Boise, ID (US)

(72) Inventors: Seungjune Jeon, Santa Clara, CA (US); Jiangli Zhu, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 20 days.

(21) Appl. No.: 16/997,303

(22) Filed: Aug. 19, 2020

(65) Prior Publication Data

US 2022/0057963 A1 Feb. 24, 2022

(51) Int. Cl.
*G06F 3/06* (2006.01)
*G06F 11/10* (2006.01)

(52) U.S. Cl.
CPC ............ *G06F 3/0659* (2013.01); *G06F 3/061* (2013.01); *G06F 3/0604* (2013.01); *G06F 3/0619* (2013.01); *G06F 3/0653* (2013.01); *G06F 3/0679* (2013.01); *G06F 11/106* (2013.01)

(58) Field of Classification Search
CPC ...... G06F 3/0659; G06F 3/0604; G06F 3/061; G06F 3/0619; G06F 3/0653; G06F 3/0679; G06F 11/106
See application file for complete search history.

(56) References Cited

U.S. PATENT DOCUMENTS

| 8,513,748 | B2 | 8/2013 | Fukumoto | |
|---|---|---|---|---|
| 9,026,765 | B1 | 5/2015 | Marshak | |
| 2014/0346625 | A1 | 11/2014 | Fukumoto et al. | |
| 2016/0357474 | A1* | 12/2016 | Frid | G06F 3/0656 |
| 2017/0109232 | A1* | 4/2017 | Cha | G06F 3/0679 |
| 2017/0372798 | A1* | 12/2017 | Hoya | G11C 29/42 |
| 2019/0114078 | A1* | 4/2019 | Oh | G06F 3/0634 |
| 2019/0115079 | A1* | 4/2019 | Park | G11C 13/0069 |
| 2020/0167273 | A1* | 5/2020 | Byun | G06F 13/1673 |
| 2021/0019254 | A1* | 1/2021 | Stonelake | G06F 12/0292 |
| 2021/0263720 | A1* | 8/2021 | Boenapalli | G06F 3/0653 |

* cited by examiner

*Primary Examiner* — Hiep T Nguyen
(74) *Attorney, Agent, or Firm* — Brooks, Cameron & Huebsch, PLLC

(57) ABSTRACT

A method includes providing, via a command, a request of enablement of a media management operation to a memory sub-system. The method further includes providing, via the command, an indication of one of a plurality of write types to the media management operation to the memory sub-system. The media management operation can be performed using the indicated write type in response to receipt of the command.

20 Claims, 5 Drawing Sheets

FIG. 2C

| | 235-1 | 235-2 | 235-3 | 235-4 | 235-5 | 235-6 | 235-7 | 235-8 | 235-9 | 235-N |
|---|---|---|---|---|---|---|---|---|---|---|
| 243 | 0 | 1 | 1 | 0 | 1 | 0 | 0 | 1 | 1 | 1 |

| | 244-1 | 244-2 | 244-3 | 244-4 | 244-5 | 244-6 | 244-7 | 244-8 | 244-9 | 244-N |
|---|---|---|---|---|---|---|---|---|---|---|
| 244 | 0 | 1 | 1 | 0 | 1 | 0 | 1 | 1 | 1 | 1 |

| | 235-1 | 235-2 | 235-3 | 235-4 | 235-5 | 235-6 | 235-7 | 235-8 | 235-9 | 235-N |
|---|---|---|---|---|---|---|---|---|---|---|
| 245 | 1 | 0 | 0 | 1 | 0 | 1 | 0 | 0 | 0 | 0 |

| | 235-1 | 235-2 | 235-3 | 235-4 | 235-5 | 235-6 | 235-7 | 235-8 | 235-9 | 235-N |
|---|---|---|---|---|---|---|---|---|---|---|
| 246 | 0 | 1 | 1 | 0 | 1 | 0 | 1 | 1 | 1 | 1 |

FIG. 2D

| | 235-1 | 235-2 | 235-3 | 235-4 | 235-5 | 235-6 | 235-7 | 235-8 | 235-9 | 235-N |
|---|---|---|---|---|---|---|---|---|---|---|
| 247 | 0 | 1 | 1 | 0 | 1 | 0 | 0 | 1 | 1 | 1 |

| | 248-1 | 248-2 | 248-3 | 248-4 | 248-5 | 248-6 | 248-7 | 248-8 | 248-9 | 248-N |
|---|---|---|---|---|---|---|---|---|---|---|
| 248 | 0 | 1 | 1 | 0 | 1 | 0 | 1 | 1 | 1 | 1 |

| | 236-1 | 236-2 | 236-3 | 236-4 | 236-5 | 236-6 | 236-7 | 236-8 | 236-9 | 236-N |
|---|---|---|---|---|---|---|---|---|---|---|
| 249 | 1 | 0 | 0 | 1 | 0 | 1 | 0 | 0 | 0 | 0 |

| | 235-1 | 235-2 | 235-3 | 235-4 | 235-5 | 235-6 | 235-7 | 235-8 | 235-9 | 235-N |
|---|---|---|---|---|---|---|---|---|---|---|
| 250 | 0 | 1 | 1 | 0 | 1 | 0 | 1 | 1 | 1 | 1 |

WRITE TYPE INDICATION COMMAND

TECHNICAL FIELD

Embodiments of the disclosure relate generally to memory sub-systems, and more specifically, relate to write type indication commands.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 2A-2D illustrate examples of memory operations to access memory cells of a memory device in accordance with some embodiments of the present disclosure.

DETAILED DESCRIPTION

Figure 1:
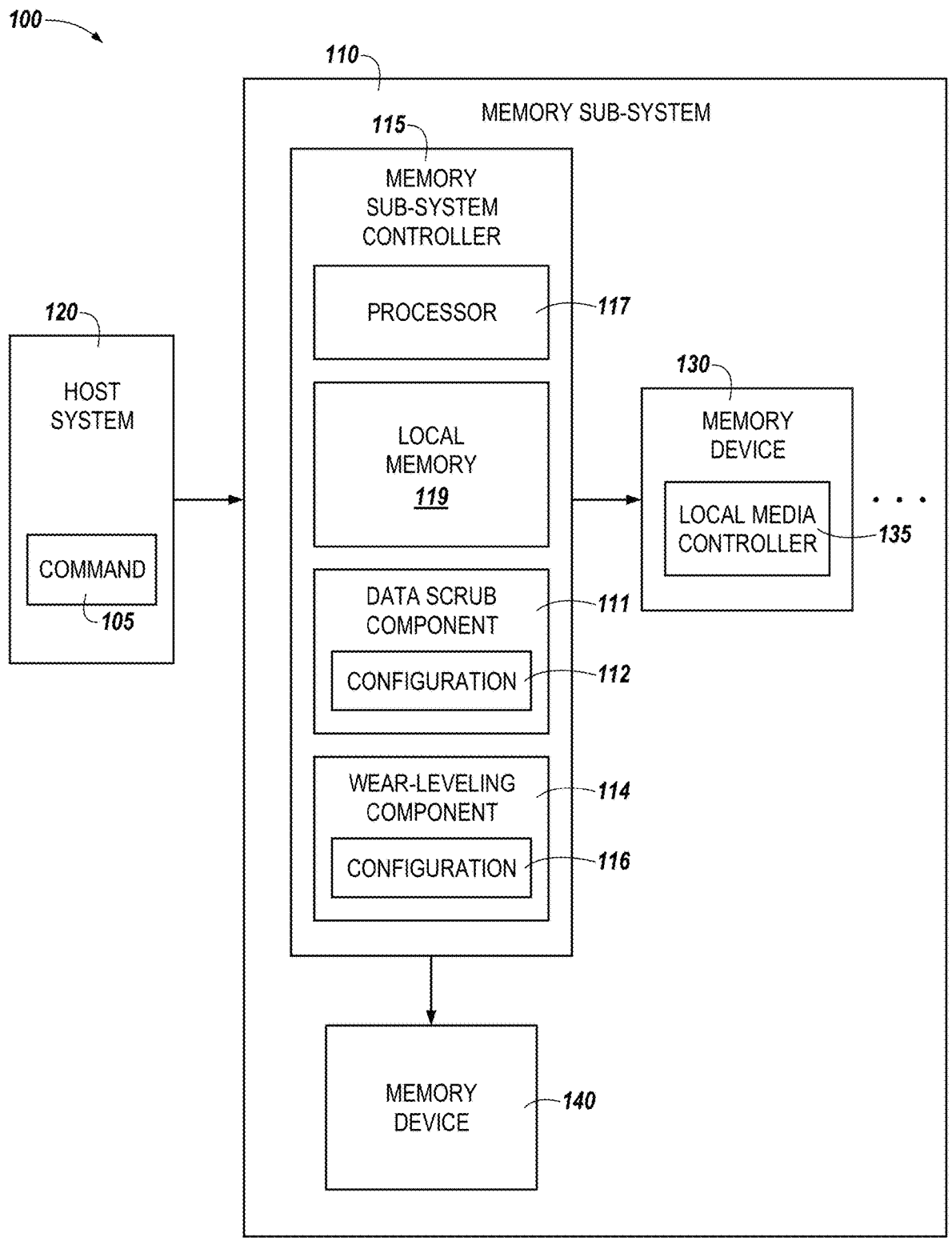
FIG. 1 illustrates an example computing system that includes a memory sub-system in accordance with some embodiments of the present disclosure.

Aspects of the present disclosure are directed to a write type indication command, in particular to providing a command that indicates one of a number of write types to be used in association with performance of a particular operation using a memory sub-system. A memory sub-system can be a storage system, storage device, a memory module, or a combination of such. An example of a memory sub-system is a storage system such as a solid-state drive (SSD). Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that include a cross-point array of non-volatile memory cells. Other examples of non-volatile memory devices are described below in conjunction with FIG. 1. A memory operation (e.g., a read, write, or other memory operation) can be initiated to read from and/or write data to storage locations (e.g., memory cells) within the memory device. In some memory devices, such as three-dimensional cross-point memory devices, different write types can be used to write data to an array of and/or a group of memory cells in the memory device.

Prior to the memory sub-system being available to customers, a manufacturer (e.g., vendor) may desire to operate memory sub-systems to test and/or diagnose the memory sub-systems. To do so, the manufacturer may couple the memory sub-systems to a manufacturer-prepared host system, which can direct the memory sub-systems to perform a number of write operations in accordance with performance of various media management operations, such as a data scrub operation, a wear-leveling operation, etc.

There can be a number of different write types having different programming characteristics and it can be beneficial to leverage those different programming characteristics by selectively indicating and/or adjusting a write type for a particular media management operation, such as a data scrub operation and/or a wear-leveling operation. However, a particular image and/or hardware circuitry that is associated with each write type can be required to be implemented to the memory sub-system each time the operation is to be performed using a different write type, which can make the initialization or pre-initialization stage time consuming and/or costly.

Aspects of the present disclosure address the above and other deficiencies by providing, to the memory sub-system, a manufacturer-initiated command to indicate which write types are to be used in association with various operations that can be performed on the memory sub-system. For example, the manufacturer-initiated command can alter a configuration associated with each operation such that each operation can be performed using a write type indicated by the configuration. Because indicating a particular write type and/or switching among a number of write types can be performed without implementing an extra image and/or hardware circuitry associated with each write type, embodiments described herein can provide benefits such as making the initialization or pre-initialization stage less time consuming and/or less costly.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110. In some embodiments, the host system 120 can be a manufacturer-prepared host system, which can be coupled to the memory sub-system 110 during an initialization or pre-initialization stage of manufacture of the memory sub-system 110. The manufacturer-prepared host system can direct the memory sub-system 110 to test, diagnose, and/or provide firmware that needs to be implemented prior to the memory sub-system 110 being available to customers. Further, as described further herein, the manufacturer-prepared host system can provide a command, which can predetermine and/or alter various parameters of configurations 112 and 116.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processing device 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a data scrub component 111 and a wear-leveling component 114. Although not shown in FIG. 1 so as to not obfuscate the drawings, the data scrub component 111 and/or wear-leveling component 114 can include various circuitry to facilitate performance of a data scrub operation and/or a wear-leveling operation using a number of write operations whose write types are indicated in respective configurations 112 and 116. For example, the data scrub component 111 and/or wear-leveling component 114 can include a special purpose circuitry in the form of an ASIC, FPGA, state machine, and/or other logic circuitry that can allow the data scrub component 111 and/or wear-leveling component 114 to orchestrate and/or perform the operations described herein. Although the configurations 112 and 116 are illustrated in FIG. 2 to be stored in the data scrub component 111 and/or wear-leveling component 114, respectively, embodiments are not limited to a particular location where the configurations 112 and 116 can be stored. For example, the configurations 112 and 116 can be also located and/or stored within the memory device 130, such as within the local media controller 135.

The data scrub component 111 can perform a data scrub operation on the memory devices 130 and/or 140 according to the configuration 112 of the data scrub component 111. As used herein, the term "data scrub operation" refers to an operation performed to correct, if any, an error within data values stored in a group of memory cells and rewrite the error-corrected data pattern to the group of memory cells. The wear-leveling component 114 can perform a wear-leveling operation on the memory devices 130 and/or 140 according to the configuration 116 of the wear-leveling component 114. As used herein, the term "wear-leveling operation" refers to an operation associated with moving data among, and/or validating and/or invalidating locations of, an array of memory cells (e.g., the memory devices 130 and/or 140) so as to prevent particular physical locations of the array from being accessed (e.g., read, written, and/or erased) more often than other physical locations. The data scrub operation and/or wear-leveling operation can be performed as a background operation.

The configurations 112 and 116 can include various parameters and/or indications, which the data scrub operation and wear-leveling operation can be performed according to. In some embodiments, the configurations 112 and 116 can include an indication of which write types to be used in association with performance of the data scrub operation and/or wear-leveling operation, respectively. For example, the configuration 112 can indicate a write type to the data scrub operation performed using the data scrub component 111. For example, the configuration 116 can indicate a write type to the wear-leveling operation performed using the wear-leveling component 114.

As illustrated in FIG. 1, the host system 120 includes (e.g., stores) a command 105 that can be issued to the memory sub-system 110, such as memory sub-system controller 115 of the memory sub-system 110. In some embodiments, the command 105 can be a vendor-specific command that can be provided from the manufacturer-prepared host system (e.g., host system 120).

The command 105 provided by the host system 120 can predetermine and/or alter various parameters of the configurations 112 and/or 116. In one example, the command 105 can enable/disable a data scrub operation and/or wear-leveling operation to enable performance of the enabled operation(s) (e.g., at a time determined by the memory sub-system controller 115) and/or disable performance of the disabled operation(s). In another example, the command 105 can indicate a write type to the data scrub operation, the wear-leveling operation, or both. In response to the command, the memory sub-system controller 115 can associate indicated write types to respective operations by writing information associated with the indicated write types to the configurations 112 and/or 116. Accordingly, the respective operations can be subsequently performed using the associated write types. Further details of providing a command and/or indicating a particular write type to a data scrub operation and/or a wear-leveling operation are described in connection with FIGS. 2-4.

FIGS. 2A-2D illustrate examples of states of memory cells prior to and subsequent to performance of respective memory operations 230, 231, 232, and 233 to access memory cells 235-1 to 235-N (collectively referred to as memory cells 235) of a memory sub-system in accordance with some embodiments of the present disclosure. The memory cells 235 can be located within a memory sub-system (illustrated as 110 in FIG. 1) and can store data (e.g., a codeword having a particular data pattern). Memory cells 235 shown in FIGS. 2A-2D can be programmed to various states, such as a reset state corresponding to a data value of a logical 0 and a set state corresponding to a data value of a logical 1. Although embodiments are not so limited, a memory cell can have a greater resistance in the reset state than in the set state, for example. Further, data patterns 234, 238, 243, and 247 respectively illustrated in FIGS. 2A-2D each represent a data pattern stored in the memory cells 235 prior to performing respective memory operations 230, 231, 232, and 233, while data patterns 237. 242, 245 (e.g., and/or a data pattern 246), and 249 (e.g., and/or a data pattern 250) respectively illustrated in FIGS. 2A-2D each represent a data pattern stored in the memory cells 236 as a result of performance of respective memory operations 230, 231, 232, and 233.

Figure 2A:
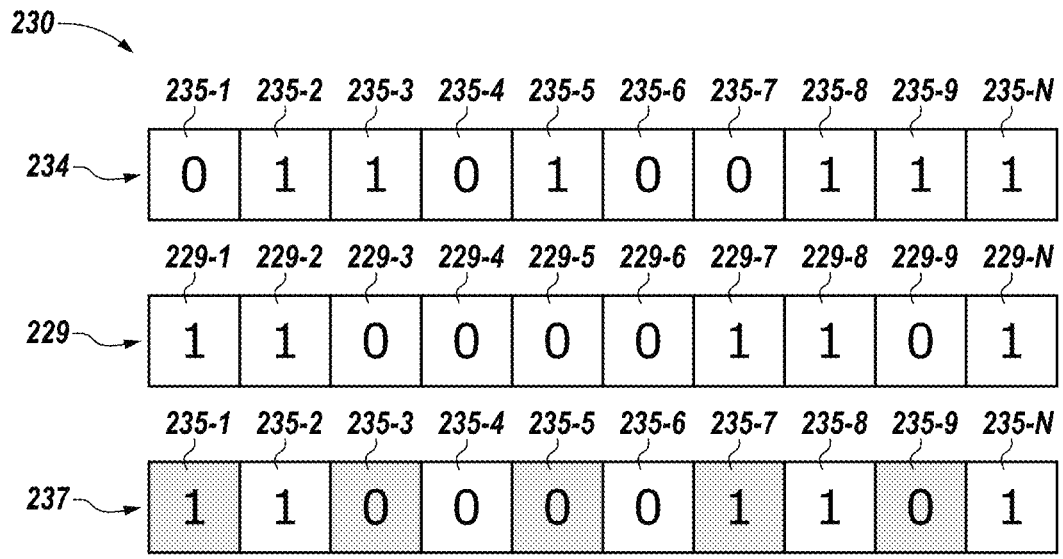
Figure 2B:
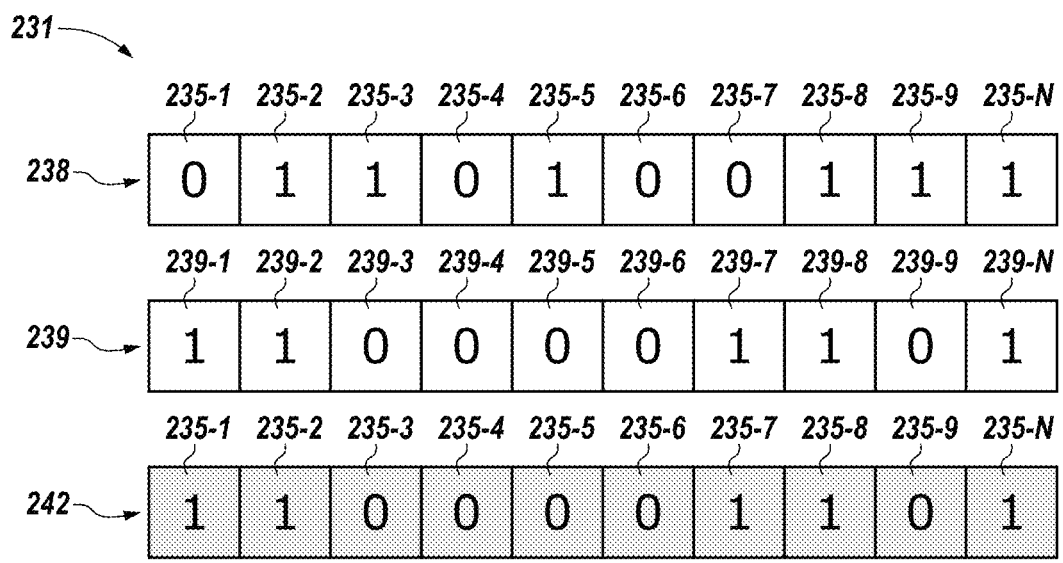

Data patterns 229 and 239 as illustrated in FIG. 2A and FIG. 2B each can represent a data pattern received, along with a command requesting the data pattern to be written to the memory cells 235, from a host (e.g., the host system 120 illustrated in FIG. 1), memory sub-system controller (e.g., the memory sub-system controller 115 illustrated in FIG. 1), and/or local controllers, such as local media controller 135 illustrated in FIG. 1. A write operation shown in FIG. 2A corresponds to a write operation having a normal write type that can write the data pattern 244 to the memory cells 235 by changing states of only those memory cells (e.g., among memory cells 235) to be programmed to a different state. For example, as illustrated in FIG. 2A, respective data values of the data pattern 234 stored in memory cells 235-1, 235-3, 235-5, 235-7, and 235-9 are different than data values 236-1, 236-3, 236-5, 236-7, and 236-9 of the data pattern 229. Therefore, the write operation of the normal write type performed on the memory cells 235 can change states of the memory cells 235-1 235-3, 235-5, 235-7, and 235-9 only. For example, a set signal can be applied to memory cells 235-1 and 235-7 and a reset signal can be applied to memory cells 235-3, 235-5, and 235-9, while no set/reset signals are applied to the memory cells 235-1, 235-3, 235-5, 235-7, and 235-9. As a result of the write operation performed on the memory cells 235, the memory cells 235 stores a data pattern 237 of "1 1 0 0 0 0 1 1 0 1" that corresponds to the data pattern 229.

A write operation shown in FIG. 2B corresponds to a write operation having a force write type that can write the data pattern 239 to the memory cells 235 by rewriting all cells of the memory cells 235 regardless of a similarity and/or match between the data pattern 238 and data pattern 239. As illustrated in FIG. 2B, for example, although data values of the data pattern 239 correspond to data values 236-2, 236-4, 236-6, 236-8, and 236-N of the data pattern 239, the write operation having the force write type performed on the memory cells 235 applies set/reset signals to all cells of the memory cells 235. For example, a set signal can be applied to memory cells 235-1, 235-2, 235-7, 235-8, and 235-N, while a reset signal can be applied to memory cells 235-3, 235-4, 235-5, 235-6, and 235-9. As a result of the write operation performed on the memory cells 235, the memory cells 235 store a data pattern 242 of "1 1 0 0 0 0 1 1 0 1" corresponding to the data pattern 239.

Data patterns 244 and 248 as illustrated in FIG. 2C and FIG. 2D each can represent a data pattern originally and/or assumed to be stored in the memory cells 235. For example, the data patterns 244 and 248 can be an error corrected data pattern of the data patterns 243 and 247 and/or a data pattern of the data patterns 243 and 247 that is redundantly stored in another location of the memory sub-system. As further described herein, a toggle normal write type and a toggle force write type are associated with rewriting, to a group of memory cells (e.g., memory cells 235), a data pattern originally and/or assumed to be stored in the group of memory cells. In rewriting the data pattern to the group, the toggle normal write type and the toggle force write type can involve inverting the data pattern (to yield in an inverted data pattern) stored in the group and re-inverting the inverted data pattern back to the re-inverted data pattern that corresponds to a data pattern originally and/or assumed to be stored in the group.

In some embodiments, an error correction operation can be performed in association with the toggle normal write type and/or toggle force write type. In one example, an error correction operation can be performed on a data pattern read from a group of memory cells but prior to inverting the data pattern (and writing the inverted data pattern back to the group). In another example, an error correction operation can be performed on an inverted data pattern but prior to re-inverting the inverted data pattern (and writing the re-inverted data pattern back to the group). An error correction operation can be performed once (either on a data pattern or an inverted data pattern) or twice (both on a data pattern or an inverted data pattern) in association with the toggle normal write type and/or the toggle force write type. However embodiments are not so limited. For example, a write operation having a toggle normal write type and/or toggle force write type can be performed without an error correction operation.

A write operation shown in FIG. 2C corresponds to a write operation having a toggle normal write type that can rewrite a data pattern originally and/or assumed to be stored in the memory cells 235 as indicated by an original data pattern 244. FIG. 2C illustrates an example scenario where the memory cell 235-7 stores an erroneous bit that has been erroneously changed from logical 1 to logical 0.

A write operation having the toggle normal write type can firstly read a data pattern from memory cells to invert the data pattern and write the inverted data pattern back to the memory cells. Accordingly, an inverted data pattern 245 of "1 0 0 1 0 1 0 0 0 0" with an error on the memory cell 235-7 corrected can be firstly written to the memory cells 235 by applying set/reset signals to the memory cells 235 except the memory cell 235-7, as illustrated in FIG. 2C. In some embodiments, a data pattern read from memory cells can be inverted without performing an error correction operation on the data pattern.

Subsequently, the inverted data pattern can be re-inverted and the re-inverted data pattern can be written back to the memory cells as part of performance of the write operation having the toggle normal write. As illustrated in FIG. 2C, for example, the inverted data pattern 245 of "1 0 0 1 0 1 0 0 0 0" can be read from the memory cells 235 and re-inverted to be a data pattern 246 of "0 1 1 0 1 0 1 1 1 1", which then can be written back to the memory cells 235. As illustrated in FIG. 2C, the re-inverted data pattern 246 can be written to the memory cells 235 by applying respective set/reset signals to all cells of the memory cells 235.

A write operation shown in FIG. 2D corresponds to a write operation having a toggle normal write type that can rewrite a data pattern originally and/or assumed to be stored in the memory cells 235 as indicated by an original data pattern 248. FIG. 2D illustrates an example scenario where the memory cell 235-7 stores an erroneous bit that has been erroneously changed from logical 1 to logical 0.

A write operation having the toggle force write type can firstly read a data pattern from memory cells to invert the data pattern and write the inverted data pattern back to the memory cells. Accordingly, an inverted data pattern 249 of "1 0 0 1 0 1 0 0 0 0" with an error on the memory cell 235-7 corrected can be firstly written to the memory cells 235 by applying set/reset signals to all cells of the memory cells 235, as illustrated in FIG. 2D. In some embodiments, a data pattern read from memory cells can be inverted without performing an error correction operation on the data pattern.

Subsequently, the inverted data pattern can be re-inverted and the re-inverted data pattern can be written back to the memory cells as part of performance of the write operation having the toggle write. As illustrated in FIG. 2D, for example, the inverted data pattern 249 of "1 0 0 1 0 1 0 0 0 0" can be read from the memory cells 235 and re-inverted to be a data pattern 250 of "0 1 1 0 1 0 1 1 1 1", which then can be written back to the memory cells 235. As illustrated in FIG. 2D, the re-inverted data pattern 249 can be written to the memory cells 235 by applying respective set/reset signals to all cells of the memory cells 235.

A normal write (and/or a toggle normal write) can provide, as compared to a force write (and/or toggle force write), benefits such as less wearing out of memory cells and/or an increased throughput, because the normal write involves applying signal(s) only to those memory cells whose data values are to be programmed to a different data value, which typically results in applying less number of signals to the memory cells. In contrast, a force write (and/or toggle force write) can provide benefits such as higher reliability, because a force write reprograms all memory cells, as compared to a normal write (and/or toggle normal write), in which some memory cells that already have experienced drifts in threshold voltage distributions are not reprogrammed to correct the drifted threshold voltage distributions.

Although embodiments are not so limited, a write type for a data scrub operation can be selected from a group different than a group from which a write type for a wear-leveling operation is selectable. For example, a data scrub operation can be performed using either a normal or a force write type, while a wear-leveling operation can be performed using either a toggle normal or a toggle force write type.

Figure 3:
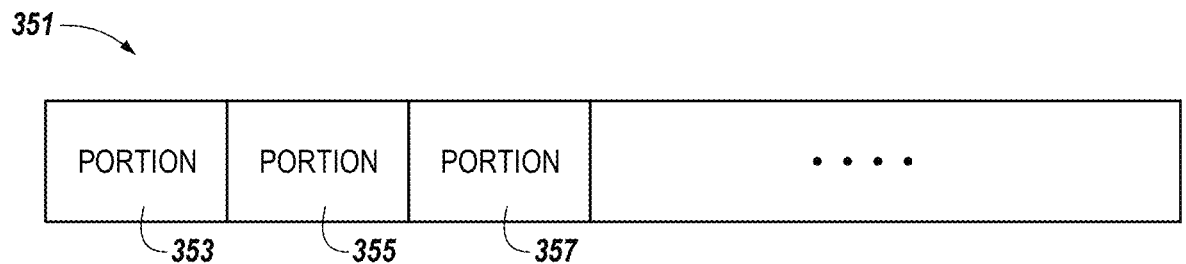
FIG. 3 illustrates an example command to set and/or alter a configuration with respect to write types of write operations to be performed on a memory device in accordance with some embodiments of the present disclosure.

FIG. 3 illustrates an example command 351 to set and/or alter a configuration with respect to write types of write operations to be performed on a memory device (e.g., memory devices 130 and/or 140 illustrated in FIG. 1) in accordance with some embodiments of the present disclosure. As described herein, the command can be provided by a host system, such as the host system 120 illustrated in FIG. 1. Although embodiments are not so limited, separate commands (e.g., such as command 351) can be provided respectively for a media management operation such as a data scrub operation and/or a wear-leveling operation. For example, one command having a format as illustrated in FIG. 3 can be provided to a data scrub component (e.g., data scrub component 111 illustrated in FIG. 1) for predetermining and/or altering a respective configuration (e.g., configuration 112 illustrated in FIG. 1) associated with a data scrub operation, while a different command having a same format can be provided to a wear-leveling component (e.g., wear-leveling component 114 illustrated in FIG. 1) for predetermining and/or altering a respective configuration (e.g., configuration 116 illustrated in FIG. 1) associated with a wear-leveling operation.

The command 351 can include various portions, such as portions 353, 355, and 357 as illustrated in FIG. 3. A portion 353 of the command 351 can include one or more bits whose data value indicates whether to enable/disable a particular media management operation (e.g., data scrub operation and/or wear-leveling operation). For example, when the command 351 provided to a memory sub-system (e.g., memory sub-system 110 illustrated in FIG. 1) indicates disablement of a data scrub operation and/or a wear-leveling operation, a memory sub-system controller (e.g., memory sub-system controller 115 illustrated in FIG. 1) can be prevented from performing a respective operation. Alternatively, when the command 351 provided to a memory sub-system (e.g., memory sub-system 110 illustrated in FIG. 1) indicates enablement of a data scrub operation and/or a wear-leveling operation, the memory sub-system controller 115 can perform a respective operation at its discretion. In some embodiments, the command 351 can forcefully direct, via setting one or more bits of the portion 353, the memory sub-system to perform the operation specified by the command once received without giving the memory sub system controller a discretion when to perform the operation.

A portion 355 of the command 351 can include one or more bits whose data value further indicates a sub-type, such as whether a write type indicated by the command 351 is of a normal or a force. For example, one data value (e.g., one binary value) of the portion 355 can indicate that the write type is of a normal, such as a normal write type or a toggle normal write type as illustrated in FIG. 2A and FIG. 2C, respectively. Alternatively, the other data value (e.g., one binary value) of the portion 355 can indicate that the write type is of a force, such as a force write type or a toggle force write type as illustrated in FIG. 2B and FIG. 2D, respectively.

A portion 357 of the command 351 can include one or more bits whose data value further indicates a sub-type, such as whether a write type indicated by the command 351 is of toggle or not. For example, one data value (e.g., one binary value) of the portion 357 can indicate that the write type is of a toggle, such as a toggle normal write type or a toggle force write type as illustrated in FIG. 2B and FIG. 2D, respectively. Alternatively, the other data value (e.g., one binary value) of the portion 357 can indicate that the write type is not of a toggle (e.g., non-toggle), such as a normal write type or a force write type as illustrated in FIG. 2A and FIG. 2C, respectively.

Although not illustrated in FIG. 3, the command 351 can include other portions and/or bits in addition to the portions 353, 355, and 357. For example, the command 351 may include one or more global bits corresponding to error correction code, such as a low-density parity-check (LDPC) code, Bose-Chaudhuri-Hocquenghen (BCH) code, Reed-Solomon (RS) code, etc.

Figure 4:
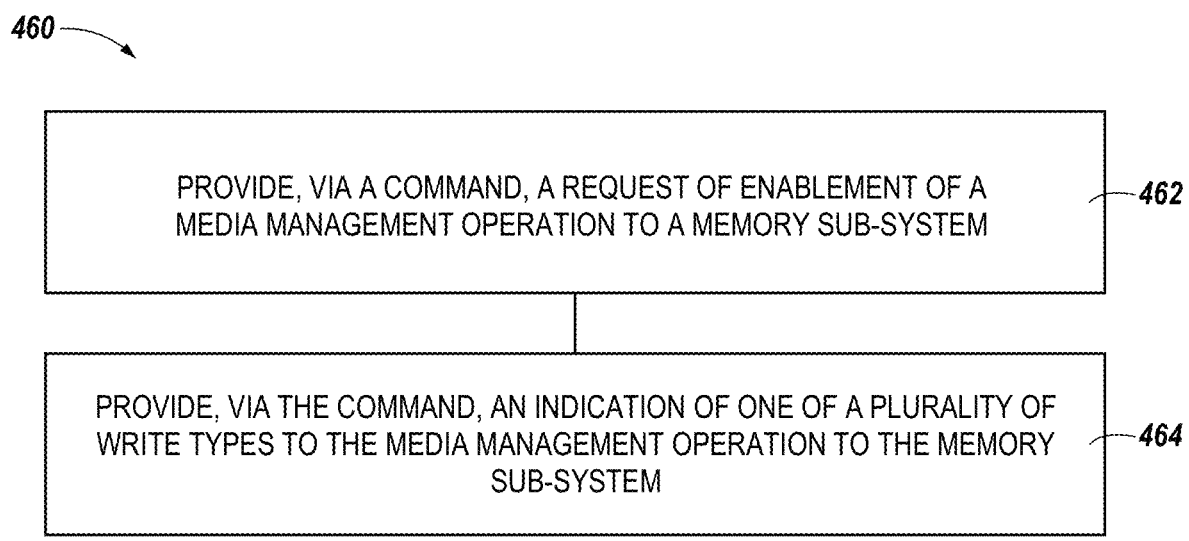
FIG. 4 is a flow diagram corresponding to a method for providing an indication of a write type via a command in accordance with some embodiments of the present disclosure.

FIG. 4 is a flow diagram corresponding to a method 460 for providing an indication of a write type via a command in accordance with some embodiments of the present disclosure. The method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by the data scrub component 111 and/or wear-leveling component 114 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 462, a command requesting enablement of a media management operation can be provided to a memory sub-system (e.g., e.g., memory sub-system 110 illustrated in FIG. 1). Along with that, At block 464, the command can further include an indication of one of write types (e.g., normal write type, force write type, toggle normal write type, and/or toggle force write type as illustrated in connection with FIG. 2) to the media management operation. As described herein, the media management operation that can be performed in accordance with the embodiments of the present disclosure can include data scrub operation, wear-leveling operation, or both. In response to receipt of the command (e.g., at the memory sub-system), the media management operation can be performed using the indicated write type. In some embodiments, a command provided to the memory sub-system can request disablement of the media management operation such that the memory sub-system is prevented from performing the disabled operation.

In some embodiments, the command can be one multiple commands. In this example, one of the commands can request enablement of the data scrub operation with an indication of a particular write type to the data scrub operation. Further, the other one of the commands can request enablement of the wear-leveling operation with an indication of a particular write type to the wear-leveling operation. The write type indicated for the data scrub operation can be different from the write type indicated for the wear-leveling operation.

In some embodiments, a command can be provided to the memory sub-system with an indication of one write type to enable a performance of the data scrub operation, the wear-leveling operation, or both, using the indicated write type. Further, a command (e.g., different command) can be subsequently provided to the memory sub-system with an indication of the other write type to alter a write type from the one write type to the other write type to enable another performance of the data scrub operation, the wear-leveling operation, or both, using the altered write type.

Figure 5:
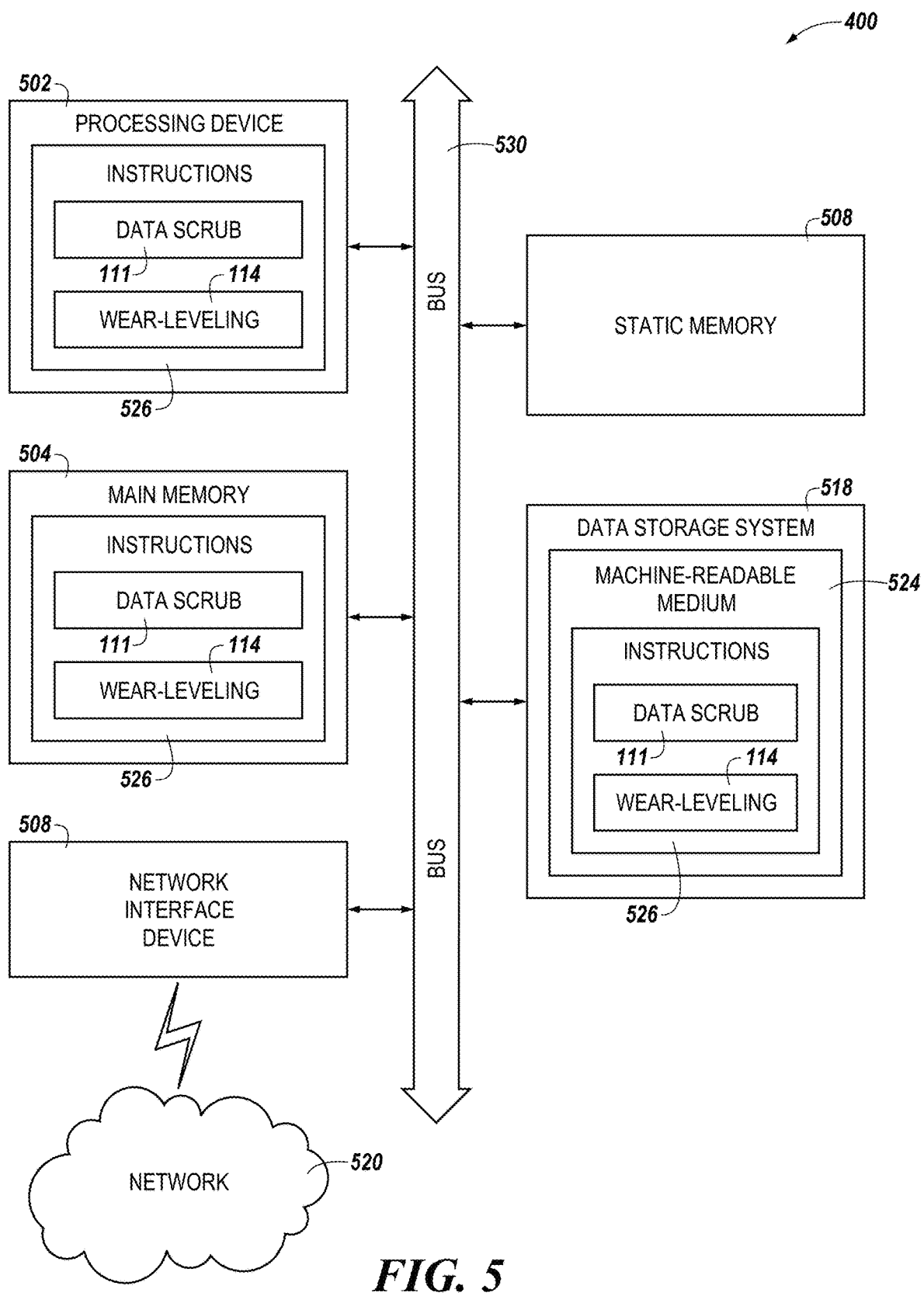
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the write determination component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data scrub component and/or a wear-leveling component (e.g., the data scrub component 111 and/or wear-leveling component 114 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   providing, via a command, a request of enablement of a media management operation to a memory sub-system; and
   providing, via the command, an indication of one of a plurality of write types to the media management operation to the memory sub-system;
   wherein the media management operation is performed using the indicated write type in response to receipt of the command.

2. The method of claim 1, wherein providing the request of enablement of the media management operation comprises providing the request of enablement of a data scrub operation, a wear-leveling operation, or both.

3. The method of claim 2, wherein the command is one of a plurality of commands including a first command and a second command, and wherein the method further comprises:
   providing the first command with enablement of the data scrub operation and an indication of a first one of the plurality of write types, wherein the data scrub operation is performed using the indicated first write type; and
   providing the second command with enablement of the wear-leveling operation and an indication of a second one of the plurality of write types, wherein the wear-leveling operation is performed using the indicated second write type.

4. The method of claim 1, wherein providing, to the memory sub-system, the command indicating one of the plurality of write types to be used for the media management operation comprises:
   providing, to the memory sub-system, a first command with an indication of a first write type of the plurality of write types to enable a first performance of the media management operation; and
   subsequently providing, to the memory sub-system, a second command with an indication of a second write type of the plurality of write types to alter a write type from the first write type to the second write type to enable a second performance of the media management operation using the altered write type.

5. A system, comprising:
   a memory device; and
   a processing device communicatively coupled to the memory device, the processing device to perform operations comprising:
      receiving a command requesting enablement of a media management operation and one of a plurality of write types to be associated to the media management operation; and
      performing, in association with performance of the media management operation, a number of write operations having the associated write type.

6. The system of claim 5, wherein the processing device to perform operations further comprises:

preventing, responsive to receiving a command requesting disablement of the media management operation, the media management operation from being performed.

7. The system of claim 5, wherein:
the media management operation comprises a data scrub operation, a wear-leveling operation, or both; and
the received commands request different write types of the plurality of write types to be associated respectively with the data scrub operation and the wear-leveling operation.

8. The system of claim 5, wherein the processing device is to perform operations comprising:
performing a write operation having a first one of the plurality of write types to write a first data pattern to a group of memory cells storing a second data pattern by changing states of those cells of the group determined to store different data values than respective data values of the second data pattern.

9. The system of claim 5, wherein the processing device is to perform operations comprising:
performing a write operation having a second one of the plurality of write types to write a first data pattern to a group of memory cells storing a second data pattern by applying set or reset signals to all cells of the group regardless of whether a data value of the first data pattern stored in the group matches a respective data value of the second data pattern.

10. The system of claim 5, wherein the processing device is to perform operations comprising:
performing a write operation having a third one of the plurality of write types to rewrite, to a group of memory cells, a data pattern stored in the group by changing states of those cells of the group determined to store different data values than the data pattern originally stored in the group.

11. The system of claim 5, wherein the processing device is to perform operations comprising:
performing a write operation having a fourth one of the plurality of write types to rewrite, to a group of memory cells, a data pattern stored in the group by applying set or reset signals corresponding to the data pattern originally stored in the group to all cells of the group.

12. A system, comprising:
a memory device; and
a processing device communicatively coupled to the memory device, the processing device to perform operations comprising:
responsive to receiving a command requesting an association of a first write type of a plurality of write types to a data scrub operation and a second write type of the plurality of write types to a wear-leveling operation:
associating the first write type to the data scrub operation; and
associating the second write type to the wear-leveling operation,
wherein the data scrub operation, the wear-leveling operation, or both, is performed using a respective one of the first write type, the second write type, or both.

13. The system of claim 12, wherein:
the first write type is one of a first portion of the plurality of write types; and
the second write type is one of a second portion of the plurality of write types that is different from the first portion.

14. The system of claim 12, wherein the plurality of write types comprises a normal write type, a force write type, a toggle normal write type, a toggle force write type or any combination thereof, and wherein the processing device is to perform operations comprising:
performing a write operation having the toggle normal write type or the toggle force write type by rewriting, to a group of memory cells, a data pattern originally stored in the group of memory cells.

15. The system of claim 14, wherein the first one of the plurality of write types corresponds to the toggle force write type.

16. The system of claim 14, wherein the processing device is to perform operations comprising:
performing a write operation having the normal write type or the force write type by writing a data pattern received from the processing device to a group of memory cells.

17. The system of claim 16, wherein the second one of the plurality of write types corresponds to the normal write type or the force write type.

18. The system of claim 12, wherein the command is a vendor specific command.

19. The system of claim 12, wherein the command comprises a plurality of bits comprising:
a first bit indicating whether to enable or disable the data scrub operation, the wear-leveling operation, or both;
a second bit indicating a first write sub-type of a write type to be associated with the data scrub operation, wear-leveling operation, or both; and
a third bit indicating a second write sub-type of the write type to be associated with the data scrub operation, wear-leveling operation, or both.

20. The system of claim 19, wherein:
the first write sub-type of the command indicates whether a write type is a normal write type or a force write type; and
the second write sub-type indicates of the command whether the write type is a toggle write type or not.

* * * * *